United States Patent
Jung (10) Patent No.: US 12,069,368 B2
(45) Date of Patent: Aug. 20, 2024

(54) IMAGE PROCESSING DEVICE AND IMAGE PROCESSING METHOD

(71) Applicant: LG INNOTEK CO., LTD., Seoul (KR)

(72) Inventor: Jee Hoon Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 87 days.

(21) Appl. No.: 17/783,197

(22) PCT Filed: Nov. 25, 2020

(86) PCT No.: PCT/KR2020/016778
§ 371 (c)(1),
(2) Date: Jun. 7, 2022

(87) PCT Pub. No.: WO2021/118111
PCT Pub. Date: Jun. 17, 2021

(65) Prior Publication Data
US 2023/0025022 A1    Jan. 26, 2023

(30) Foreign Application Priority Data
Dec. 11, 2019   (KR) .......................... 10-2019-0164898

(51) Int. Cl.
*H04N 23/68* (2023.01)
*G06N 20/00* (2019.01)
*H04N 23/10* (2023.01)

(52) U.S. Cl.
CPC ......... *H04N 23/6812* (2023.01); *G06N 20/00* (2019.01); *H04N 23/683* (2023.01); *H04N 23/685* (2023.01); *H04N 23/10* (2023.01)

(58) Field of Classification Search
CPC ...... G06N 20/00; G06N 3/0464; G06N 3/084; G06N 3/08; H04N 23/683; H04N 23/685;
(Continued)

(56) References Cited

U.S. PATENT DOCUMENTS

| 2007/0183765 A1 | 8/2007 | Imamura |
| 2014/0293073 A1 | 10/2014 | Okamura et al. |

(Continued)

FOREIGN PATENT DOCUMENTS

| CN | 1848921 A | 10/2006 |
| CN | 101437166 A | 5/2009 |

(Continued)

OTHER PUBLICATIONS

Zhang et al., "Deep Motion Blur Removal Using Noisy/Blurry Image Pairs", Department of Electrical Engineering, University of Notre Dame, Indiana, USA, Nov. 19, 2019, [retrieved on Jan. 13, 2021], Retrieved from the Internet: <URL: https://www.researchgate.net/publication/337413160_Deep_Motion_Blur_Removal_Using_NoisyBlurry_Image_Pairs>, total 10 pages.

*Primary Examiner* — Boubacar Abdou Tchoussou
(74) *Attorney, Agent, or Firm* — Birch, Stewart, Kolasch & Birch, LLP (57) ABSTRACT

An image processing device according to one embodiment comprises a processing unit which receives first Bayer data from an image sensor, receives gyro data from a gyro sensor, and generates, from the first Bayer data, by using the received gyro data, second Bayer data compensated for camera movement.

14 Claims, 9 Drawing Sheets

(58) Field of Classification Search
CPC ........ H04N 23/10; H04N 23/11; H04N 23/57;
H04N 23/617; H04N 23/54; H04N 23/55;
H04N 23/684
See application file for complete search history.

(56) References Cited

U.S. PATENT DOCUMENTS

| | | | |
|---|---|---|---|
| 2014/0379103 | A1 | 12/2014 | Ishikawa et al. |
| 2016/0037085 | A1 | 2/2016 | Mills et al. |
| 2018/0330473 | A1* | 11/2018 | Foi .......................... G06T 7/337 |
| 2019/0108618 | A1* | 4/2019 | Hwang ................. G06T 3/4046 |
| 2020/0077023 | A1* | 3/2020 | Kang .................. H04N 23/6812 |
| 2021/0176399 | A1* | 6/2021 | Byon ................... H04N 23/685 |

FOREIGN PATENT DOCUMENTS

| | | | |
|---|---|---|---|
| CN | 103402058 | A | 11/2013 |
| CN | 103426182 | A | 12/2013 |
| CN | 108171250 | A | 6/2018 |
| CN | 108353152 | A | 7/2018 |
| CN | 110290323 | A | 9/2019 |
| TW | 201027982 | A | 7/2010 |

* cited by examiner

IMAGE PROCESSING DEVICE AND IMAGE PROCESSING METHOD

CROSS REFERENCE TO RELATED APPLICATIONS

This application is the National Phase of PCT International Application No. PCT/KR2020/016778, filed on Nov. 25, 2020, which claims priority under 35 U.S.C. 119(a) to Patent Application No. 10-2019-0164898, filed in the Republic of Korea on Dec. 11, 2019, all of which are hereby expressly incorporated by reference into the present application.

TECHNICAL FIELD

The present invention relates to an image processing device, and more particularly, to an image processing device and an image processing method for generating Bayer data in which an image is stabilized and blur is removed using a deep learning algorithm.

BACKGROUND ART

Since a clear image cannot be obtained when camera movement occurs due to hand shake, the image stabilizer function in a camera that compensates for camera movement is a very important function for obtaining high-quality images. Image safety functions are largely divided into optical image stabilization (OIS) and electronic image stabilization (EIS). OIS is a technology that stabilizes the image by moving the image sensor or lens according to the camera movement, and EIS is a technology for image compensation using a stabilization algorithm through image processing.

EIS is inferior in performance to OIS due to structural limitations, but has advantages in terms of price and size. Moreover, as the market trend develops to enhance high magnification zoom, image stabilization technology is becoming more and more important, and as for the existing VCM type OIS, the accuracy of OIS at high magnification becomes a problem due to the limitation of the accuracy in control.

Efforts have been made to improve image quality by introducing OIS in DSLRs to small cameras in order to solve the problem that the quality of the captured image is deteriorated due to blur on the screen due to hand shake or vibration.

In the case of mobile, since the first introduction of the OIS function to the camera, the OIS function has become an essential function enough to be adopted by most manufacturers with reference to the flagship model.

As the market trend develops in the direction of strengthening the high magnification, the OIS function has become more important, but the OIS performance at high magnification is degraded due to the limitations of mechanical technology.

In some cases, EIS is adopted for low-end mobile cameras or vehicle cameras due to the price disadvantage of OIS module or the problem of mechanical reliability, however, until now, EIS has inferior performance to OIS, and loss of angle of view occurs, and since the blur that occurs during the camera exposure time cannot be removed, a satisfactory performance cannot be obtained in an environment for photographing at night or indoors (environment requiring a long exposure time).

In particular, when the camera is used as an advanced driver assistance system (ADAS), a blurred image acquired by vibration or shaking has the possibility of significantly reducing the recognition rate.

In order to improve the control preciseness of the existing VCM, OIS using technologies such as MEMS is under development, but there are problems with high cost and reliability.

DETAILED DESCRIPTION OF THE INVENTION

Technical Subject

A technical subject to be solved by the present invention is to provide an image processing device, a camera module, and an image processing method for generating Bayer data in which an image is stabilized and blur is removed.

The subjects of the present invention are not limited to the subjects mentioned above, and other subjects not mentioned will be clearly understood by those skilled in the art from the following description.

Technical Solution

In order to solve the above technical subjects, an image processing device according to an embodiment of the present invention includes a processor that receives first Bayer data from an image sensor, receives gyro data from a gyro sensor, and generates second Bayer data obtained by compensating for camera movement from the first Bayer data using the gyro data received.

In addition, the processor may perform deep learning to generate the second Bayer data from the first Bayer data.

In addition, the processor may remove blur included in the first Bayer data.

In addition, the processor may perform deep learning using a first deep learning parameter derived through training on Bayer data processing.

In addition, the first deep learning parameter may include: a variable parameter that varies according to the gyro data; and a fixed parameter independent of the gyro data.

In addition, the training for Bayer data processing may perform the training by: receiving continuous Bayer data and gyro data in a moving environment; obtaining an average image of adjacent frames of a first frame data that is one of the continuous Bayer data; generating input data by performing degradation on the obtained average image based on frame data following the first frame data; using the generated input data and gyro data as deep learning training input data; and using the first frame data as deep learning training comparison data.

In addition, the first Bayer data may be data whose movement is optically compensated by operating an actuator of the camera module using position data being received from a Hall sensor.

In addition, the processor may be formed on an image sensor module, a camera module, or an AP module.

In order to solve the above technical subjects, a camera module according to an embodiment of the present invention comprises: an image sensor for generating first Bayer data; a gyro sensor that detects movement and generates gyro data; and a first processor configured to generate second Bayer data obtained by compensating for camera movement from the first Bayer data by using the gyro data received.

In addition, a Hall sensor for generating position data by detecting the movement of the camera module; a second processor for operating an actuator using the position data received from the Hall sensor; and an actuator operating under the control of the second processor.

Advantageous Effects

According to embodiments of the present invention, it is possible to solve the deterioration of image quality caused by hand shake or vibration. In addition, it is possible to solve the performance degradation that may occur in OIS even at high magnification. By processing not only camera movement compensation but also blur removal in Bayer data, which is a raw data, a high-quality image can be obtained due to a large amount of information.

The effect according to the present invention is not limited by the contents exemplified above, and more various effects are included in the present specification.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

Figure 1:
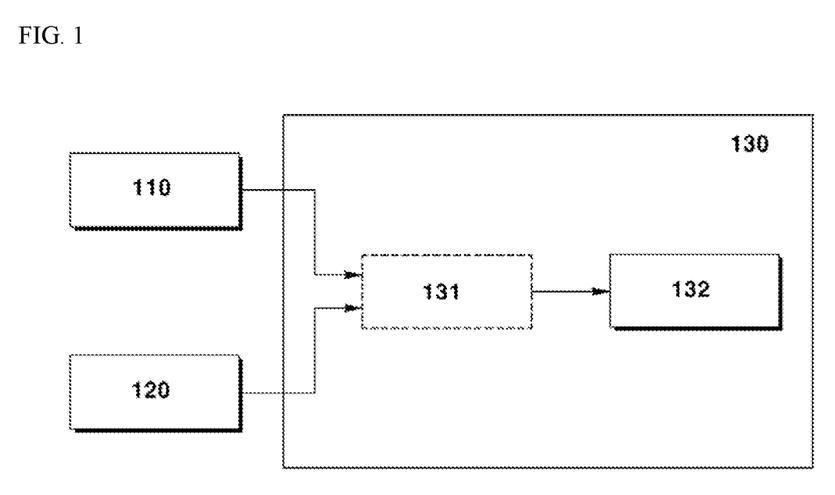
FIG. 1 is a block diagram of an image processing device according to an embodiment of the present invention.

FIG. 1 is a block diagram of an image processing device according to an embodiment of the present invention.

The image processing device 130 according to an embodiment of the present invention includes a processor 132 and may include a receiving unit 131. In addition, it may include one or more memories (not shown).

The processor 132 receives first Bayer data from the image sensor 110, receives gyro data from the gyro sensor 120, and generates second Bayer data obtained by compensating for camera movement from the first Bayer data using the gyro data received.

More specifically, in order to compensates for the originally unintended movement occurring in first Bayer data generated by the image sensor 110 due to the camera movement, first, first Bayer data is received from the image sensor 110, and gyro data is received to determine how much movement has occurred. First Bayer data may be received from the image sensor 110 and gyro data may be received from the gyro sensor 120 through the receiving unit 131.

In the first Bayer data received from the image sensor 110, data on an image whose imaging angle is changed due to camera movement according to hand shake or vibration may be received, rather than data on an image to be photographed originally. By compensating for camera movement that has affected the first Bayer data, data for an image to be photographed when there is no camera movement may be generated. That is, image-stabilized data can be generated.

Image stabilization is a function that moves the center coordinates of the current image from the correlation between the gyro data and the image of the previous frame, and it is possible to transmit an image whose center has been moved, or to handover only coordinate information to be moved to the ISP.

In order to compensate for camera movement, gyro data indicating the degree of camera movement is used. The gyro sensor 120 may be integrated with the image sensor 110 and move together, and may sense gyro data. Therefore, since the gyro data measured by the gyro sensor 120 is data that reflects the camera movement, the camera movement may be compensated for the first Bayer data received from the image sensor 110 using the gyro data received from the gyro sensor 120, and second Bayer data in which camera movement is compensated may be generated.

The gyro of the gyro sensor 120 means 'rotating', and is a sensor that detects a rotation angle of a rotating object. The gyro sensor 120 is a sensor that uses a value of angular velocity, which is the rotational speed of an object, and is also referred to as an angular velocity sensor. The angular velocity can be calculated by converting the Coriolis force generated during the rotational movement of an object into an electrical signal. Here, the Coriolis force is proportional to the speed of a moving object and means a force perpendicular to the direction of movement. By using the Coriolis force, the rotation angle and inclination of a rotating object can be known, and the direction and degree of movement can be known by accumulating them.

In compensating for camera movement, Bayer data is used. The image sensor 110 may include an image sensor such as a complementary metal oxide semiconductor (CMOS) or a charge coupled device (CCD) that converts light entering through a lens of the camera module into an electrical signal. The image sensor 110 may generate Bayer data including information on a Bayer pattern using the acquired image through a color filter. Bayer data is raw data generated and output by the image sensor 110, and since it is data before image processing, it contains a lot of information. The processing quality can be improved by compensating for movement in Bayer data which contains rich information.

The processor 132 may perform deep learning to generate second Bayer data from first Bayer data. In generating the second Bayer data in which the camera movement is compensated from the first Bayer data, the processor 132 may use deep learning. In addition to deep learning, the second Bayer data may be generated from the first Bayer data by using various algorithms for compensating for camera movement. A process in which the processor 132 performs deep learning to generate second Bayer data from the first Bayer data may be performed as follows.

Figure 2:
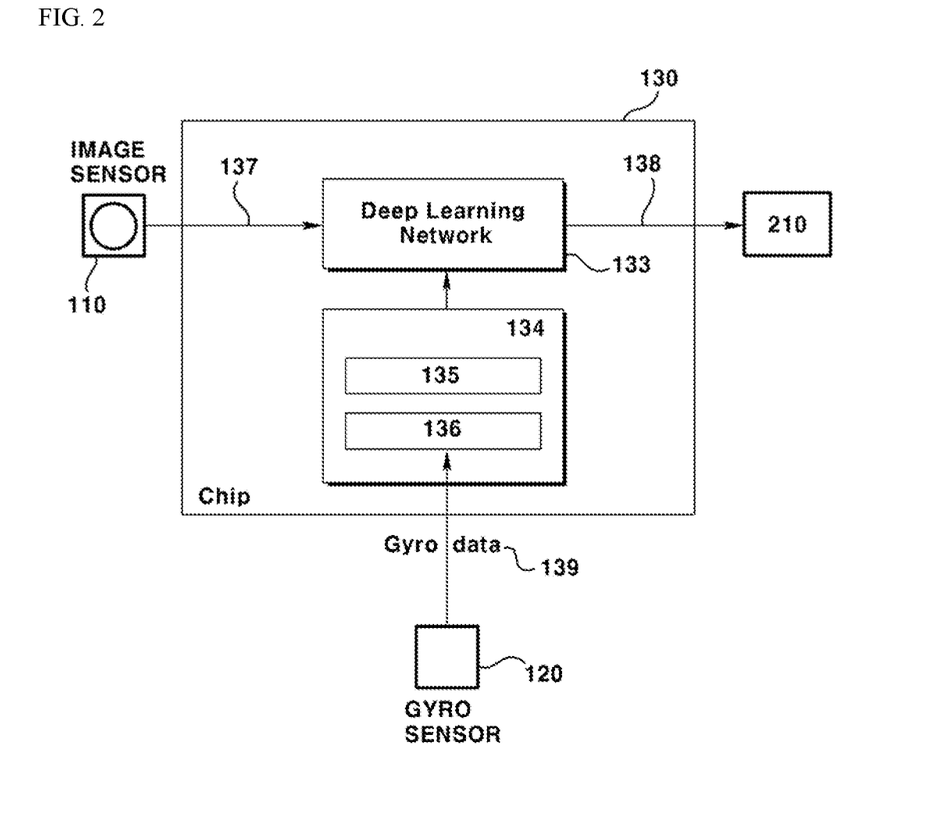
FIGS. 2 to 5 are diagrams illustrating an image processing process of an image processing device according to an embodiment of the present invention.

As shown in FIG. 2, the processor 132 includes a deep learning network 133 that generates second Bayer data 138 in which camera movement is compensated from first Bayer data 137 affected by camera movement, and may save Bayer parameters 134, which are deep learning parameters being used to generate second Bayer data 138 from first Bayer data 137. The deep learning parameters 134 may be stored in a memory. The processor 132 may be implemented in the form of a chip to generate second Bayer data from the first Bayer data.

The Bayer parameter 134 used in generating second Bayer data 138 from the first Bayer data 137 may vary depending on how much the camera moves. The Bayer parameter 134, which is a deep learning parameter, may include a variable parameter 136 that varies according to the gyro data and a fixed parameter 135 that is independent of the gyro data. Among the various parameters comprising the deep learning parameters, a parameter variable by the gyro data is a variable parameter 136, and a parameter used to generate the second Bayer data 138 from the first Bayer data 137 independently of the gyro data may be a fixed parameter 135. The variable parameter 136 is set according to the received gyro data, and when the gyro data received is different from the previous gyro data, it may be variable according to the current gyro data. The variable parameter 136 and the fixed parameter 135 may be stored as one parameter or as separate parameters.

The processor 132 may include one or more processors, and at least one program instruction executed by the processor may be stored in one or more memories. The memory may include a volatile memory such as SRAM or DRAM. However, the present invention is not limited thereto, and in some cases, it may include such as a non-volatile memory such as a flash memory, a read only memory (ROM), an erasable programmable read only memory (EPROM), or an electrically erasable programmable read only memory (EEPROM).

A typical camera device or camera module outputs data in the form of an image after receiving the Bayer pattern from the image sensor and applying a color interpolation process such as color interpolation or demosaic, and extracts information including Bayer pattern information and transmits the information including the extracted information to the outside. Here the Bayer pattern may include raw data being outputted by an image sensor that converts an optical signal included in a camera device or camera module into an electrical signal.

To explain this in detail, an optical signal transmitted through a lens included in the camera module may be converted into an electrical signal through each pixel disposed in the image sensor capable of detecting colors of R, G, and B. If the specification of the camera module is 5 million pixels, it can be considered that the image sensor including 5 million pixels capable of detecting colors of R, G, and B is included. Although the number of pixels is 5 million, it can be seen that monochrome pixels that detect only the brightness of black and white rather than actually detecting each color are combined with any one of R, G, and B filters. That is, in the image sensor, R, G, and B color filters are arranged in a specific pattern on the monochromatic pixel cells arranged by the number of pixels. Accordingly, R, G, and B color patterns are intersected according to the user's (i.e., human) visual characteristics, and this is called a Bayer pattern. In general, the Bayer pattern has a smaller amount of data than image data. Therefore, even a device equipped with a camera module that does not have a high-end processor can transmit and receive Bayer pattern image information relatively faster than image data, and based on this, there is an advantage of being able to convert images of various resolutions.

For example, since a camera module is mounted on a vehicle, the camera module does not require many processors to process images even in an environment where the low voltage differential signaling (LVDS) having a full-duplex transmission speed of 100 Mbit/s is used, and thus it is not overloaded so that it may not endanger the driver or the safety of the driver using the vehicle. In addition, since the size of data transmitted by the in-vehicle communication network can be reduced, even if it is applied to an autonomous vehicle, it is possible to eliminate problems caused by the communication method, communication speed, and the like according to the operation of a plurality of cameras disposed in the vehicle.

In addition, when transmitting Bayer data of the Bayer pattern to the first processor 132, the image sensor 110 may transmit data after down-sampling the Bayer pattern frame to a size of 1/n. After performing smoothing through a Gaussian filter or the like on the received Bayer pattern data before downsampling, downsampling may be performed. Thereafter, after generating a frame packet based on the down-sampled image data, the completed frame packet may be transmitted to the first processor 132. However, this function may be performed by the first processor 132 instead of the image sensor.

In addition, the image sensor may include a serializer (not shown) that converts the Bayer pattern into serial data in order to transmit Bayer data using a serial communication method such as a low voltage differential signaling (LVDS). The serializer typically includes or may be implemented with a buffer that temporarily stores data and a phase-locked loop (PLL) that forms a period of data to be transmitted. The deep learning algorithm (model) applied to the processor 132 is an algorithm for generating second Bayer data by compensating for camera movement included in the first Bayer data inputted using the gyro data, and deep learning training may mean an optimal algorithm generated by repeatedly performing learning.

Deep learning, also referred to as deep structured learning, refers to a set of algorithms related to machine learning that attempts high-level abstraction (a task that summarizes core contents or functions in large amounts of data or complex data) through a combination of several nonlinear transformation methods.

Specifically, deep learning expresses any learning data in a form that a computer can understand (for example, in the case of an image, pixel information is expressed as a column vector, and the like), and is a learning technique for a lot of research (how to make a better representation technique and how to make a model to learn these) to apply these to learning, and may include learning techniques such as deep neural networks (DNN) and deep belief networks (DBN).

Figure 3:
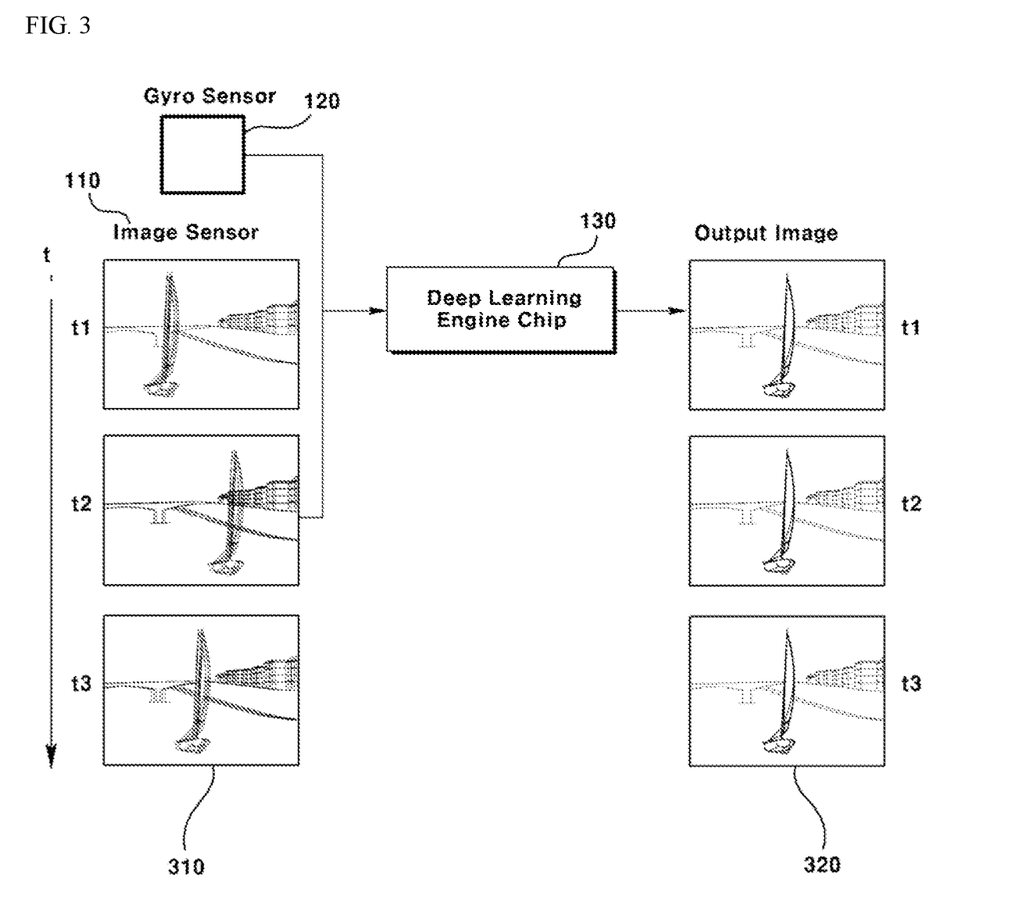

The deep learning process performed by the processor 132 may be performed as shown in FIG. 3. A continuous series of data is received from the image sensor 110, and gyro data is received from the gyro sensor 120. The gyro data received from the gyro sensor 120 may be gyro data generated by the movement of the camera during a time during which the Bayer data received from the image sensor 110 is generated. As shown in FIG. 3, when a camera movement occurs when first Bayer data 310 from t1 to t3 is received, it can be seen that the position of the subject is shaken every time. The processor 132, which is a deep learning engine chip that performs deep learning, outputs a second Bayer data 320 for each time at which the camera movement is compensated by receiving the first Bayer data 310 and the gyro data representing the movement at the time when the first Bayer data 310 is being generated.

When the processor 132 performs deep learning to generate second Bayer data from the first Bayer data, deep learning parameters are used, and the processing quality varies according to the deep learning parameters. The first deep learning parameter used by the processor 132 to generate second Bayer data from the first Bayer data by performing deep learning may be derived through deep learning training.

Deep learning can be divided into training and inference. Training refers to the process of learning a deep learning model through input data, and inference refers to the process of performing image processing with the learned deep learning model. Performing deep learning generally means performing a deep learning inference. Hereinafter, performing deep learning is to perform a deep learning inference and will be described separately from deep learning training.

In order to perform deep learning to generate second Bayer data from the first Bayer data, the first deep learning parameters required for Bayer data processing must be derived through training. When the first deep learning parameter is derived through training, the second Bayer data may be generated from the first Bayer data by performing deep learning using the deep learning model to which the corresponding Bayer parameter is applied. Therefore, a training process for deriving parameters for performing deep learning should be performed.

Figure 4:
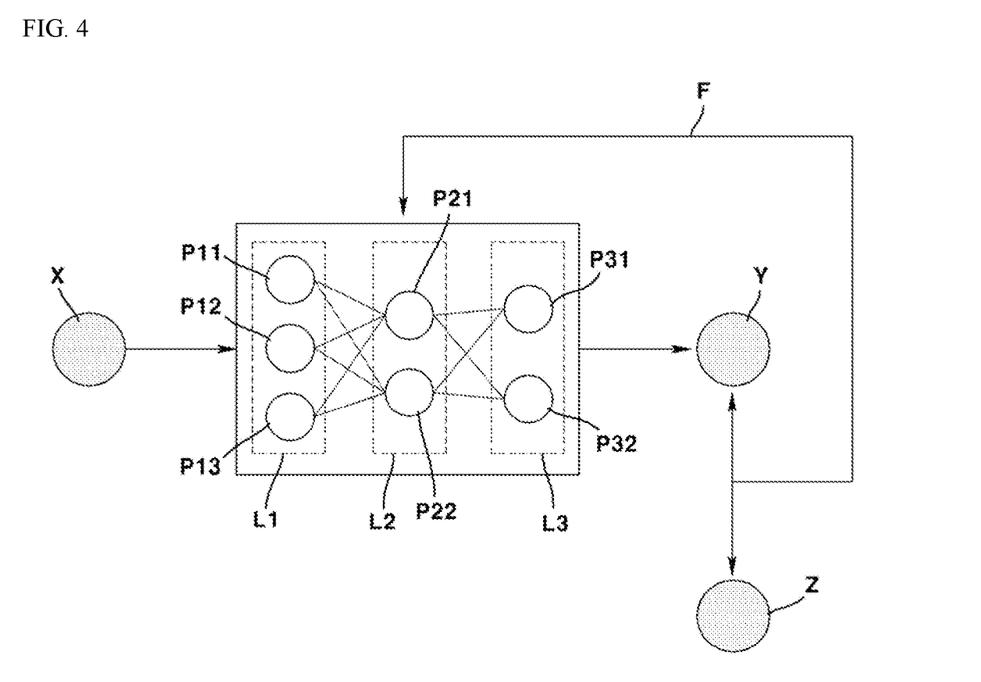

The deep learning training process may be performed through repetitive learning as shown in FIG. 4. After receiving the first sample data X and the second sample data Z having different resolutions, deep learning training may be performed based thereon.

Specifically, based on the parameters generated by comparing and analyzing the first output data Y and the second sample data Z that have been subjected to deep learning training using the first sample data X as input data, a higher resolution algorithm that generate Bayer data can be generated.

Here, the output data Y is data outputted through actual deep learning, and the second sample data Z is data inputted by the user and may mean data that can be most ideally outputted when the first sample data X is inputted to the algorithm.

Here, the first sample data X may be generated from the second sample data Z. That is, continuous Bayer data and gyro data may be received in a moving environment, and the Bayer data may be used as the second sample data Z. In this case, the movement may mean a global movement. In this case, the gyro data needs to be synchronized with the frame data. First frame data, which is one of continuous Bayer data, may be used as second sample data Z. An average image of adjacent frames of the first frame data corresponding to the second sample data Z is obtained, and performance degradation is performed on the obtained average image based on frame data following the first frame data. The first sample data X, which is the input data, may be generated.

Using the generated input data and gyro data as first sample data X that is deep learning training input data, the difference between the two data is calculated by comparing and analyzing the first output data Y and the second sample data Z being outputted through deep learning, and feedback can be given to the parameters of the deep learning model in the direction of reducing the difference between the two data. At this time, the difference between the two data may be calculated through a mean squared error (MSE) method, which is one of the loss functions. In addition, various loss functions such as cross entropy error (CEE) and the like can be used.

Specifically, after analyzing the parameters affecting the output data, feedback is given by changing or deleting the parameters or creating new parameters so that there may be no difference between the second sample data Z, which is the ideal output data, and the first output data Y, which is the actual output data.

As illustrated in FIG. 4, it may be assumed that there are a total of three layers affecting the algorithm L1, L2, and L3, and there are a total of 8 parameters P11 P12, P13, P21, P22, P31, and P32 respectively in each layer. In this case, if the difference between the first output data Y, which is the actual output data, and the second sample data Z, which is the most ideal output data, is increasing when the parameter is changed in the direction of increasing the value of the P22 parameter, the feedback may change the algorithm in the direction of decreasing the P22 parameter. Conversely, if the difference between the first output data Y, which is the actual output data, and the second sample data Z, which is the most ideal output data, is decreasing when the parameter is changed in the direction of increasing the value of the P33 parameter, the feedback may change the algorithm in the direction of increasing the P33 parameter. That is, through this method, the algorithm to which deep learning is applied in a way that the first output data Y, which is the actual output data, is outputted similarly to the second sample data Z, which is the most ideal output data.

In deriving the parameter, a variable parameter that varies according to the gyro data and a fixed parameter independent of the gyro data may be derived.

Deep learning training may be performed on the same deep learning network as the deep learning network included in the processor 132 of FIG. 2 or a deep learning network corresponding thereto. That is, it may be performed on a deep learning network having the same deep learning network environment. A deep learning network in deep learning training is a deep learning network generating first output data Y by receiving first sample data X, and may further include a network for adjusting the deep learning parameters in the deep learning training process. Here, the network that adjusts the parameters may be a deep learning network, and it may be a network that compares the first output data Y and second sample data Z and adjusts parameters according to the comparison result. The processor 132 may generate the second Bayer data from first Bayer data by using a deep learning network that has performed deep learning training or a corresponding deep learning network. In performing deep learning in the processor 132, a network that adjusts parameters may not be included. That is, a network that adjusts parameters is required in the deep learning training process, and the set parameters are used in the process of performing deep learning in the processor 132, but a network that adjusts the parameters may not be used. Or, when the processor 132 includes a function to adjust parameters, the processor 132 may include a network for adjusting parameters.

In deep learning training, as shown in FIG. 4, when an output result and a comparison target exist, and learning is performed through comparison with the comparison target, training can also be performed using a reward value. In this case, it is possible to first recognize the surrounding environment and transmit the current environment state to a processor that performs deep learning training. The processor performs an action corresponding to it, and the environment informs the processor of the reward value according to the action again. And the processor takes the action that maximizes the reward value. Training can be performed by repeatedly performing learning through this process. In addition, deep learning training can be performed using various deep learning training methods.

The processor 132 may not only compensate for camera movement of first Bayer data, but may also remove blur included in first Bayer data. Blur may be included in first Bayer data not only due to camera movement due to hand shake or vibration, but also movement of the subject at the time of photographing. Here, blur includes movement blur and refers to distinct streaks of fast-moving objects reflected in a continuous image. It occurs when the exposure is long, the movement of the subject is fast, or there is a change in the image while shooting one frame. Since it is difficult to obtain a clear image when there is blurring, a process of removing the blur is performed to obtain a clear image. When blur is removed by an image signal processor (ISP), blur can be removed from RGB data. The process of removing blur is called de-blur. The processor 132 may remove blur while compensating for camera movement on Bayer data. At this time, the processor 132 may perform deep learning to compensate for camera movement from first Bayer data and generate second Bayer data from which blur is removed. The de-blur function may receive gyro data generated during the exposure time of the camera from the gyro sensor 120 and use the gyro data and the first Bayer data to obtain clear second Bayer data from which blur is removed.

From the training stage of FIG. 4, through comparison with the second sample data Z where there is no camera movement and blur, first deep learning parameter may be generated from first sample data X in which camera movement and blur exist. Referring to FIG. 3, it is possible to check the blur in which the subject is shaken in the first Bayer data. It can be confirmed that the processor 132 can generate clear second Bayer data from which blur is removed while compensating for camera movement by performing deep learning. Since camera movement compensation and blur removal can be performed at the same time, more accurate and clear data can be generated compared to OIS that optically compensates for movement or EIS that electronically compensates for movement.

Figure 5:
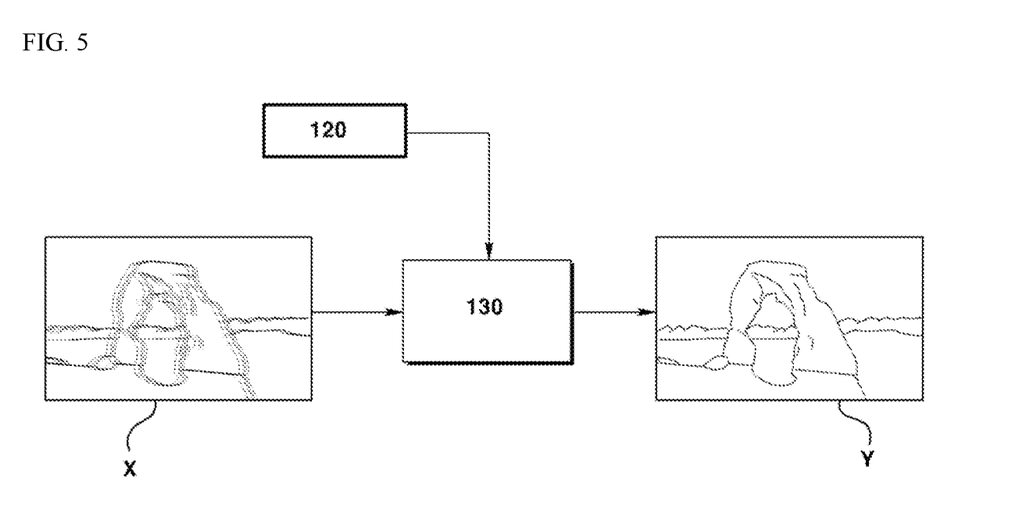

As described above, the processor 132 may perform deep learning with the deep learning model learned using the first deep learning parameter derived through training. As shown in FIG. 5, the processor of the image processing device 130 receives the first Bayer data X including camera movement and blur and the gyro data from the gyro sensor 120, and may generate and output second Bayer data Y in which camera movement is compensated and blur is removed by performing deep learning.

First Bayer data, which is input data for generating second Bayer data by compensating for camera movement, may be data whose movement is optically compensated by operating an actuator of the camera module using position data received from a Hall sensor.

The image processing device 130 may include an OIS processor that performs optical image stabilization as well as a processor 132 for compensating for camera movement. The image processing device 130 may include only the processor 132 or both the OIS processor and the processor 132 as a processor or IC for compensating for camera movement. In the case of including the OIS processor, the processor 132 may receive data compensated for camera movement by the OIS processor and perform additional compensation.

For OIS that optically compensates for movement, it is a method of optically compensating for movement by controlling an actuator that operates a lens according to the position data being detected from a Hall sensor and the gyro data sensed from the gyro sensor 120; although the quality of the calibrated data is better when compared to EIS, the performance at high magnification may be deteriorated due to the limitations of mechanical technology. In addition, it is difficult to remove the blur included in the first Bayer data only with the OIS. Accordingly, the processor 132 may additionally compensate for camera movement for the data obtained by optically compensating for movement by applying OIS. Through this, it is possible to increase the accuracy of the compensation for camera movement beyond the limit of compensating for camera movement only with the OIS. In addition, as described above, the processor 132 may perform deep learning to remove the blur, and by applying this, it goes beyond the limit where it is difficult to remove blur with OIS alone, thereby also removing blur from Bayer data.

Figure 6:
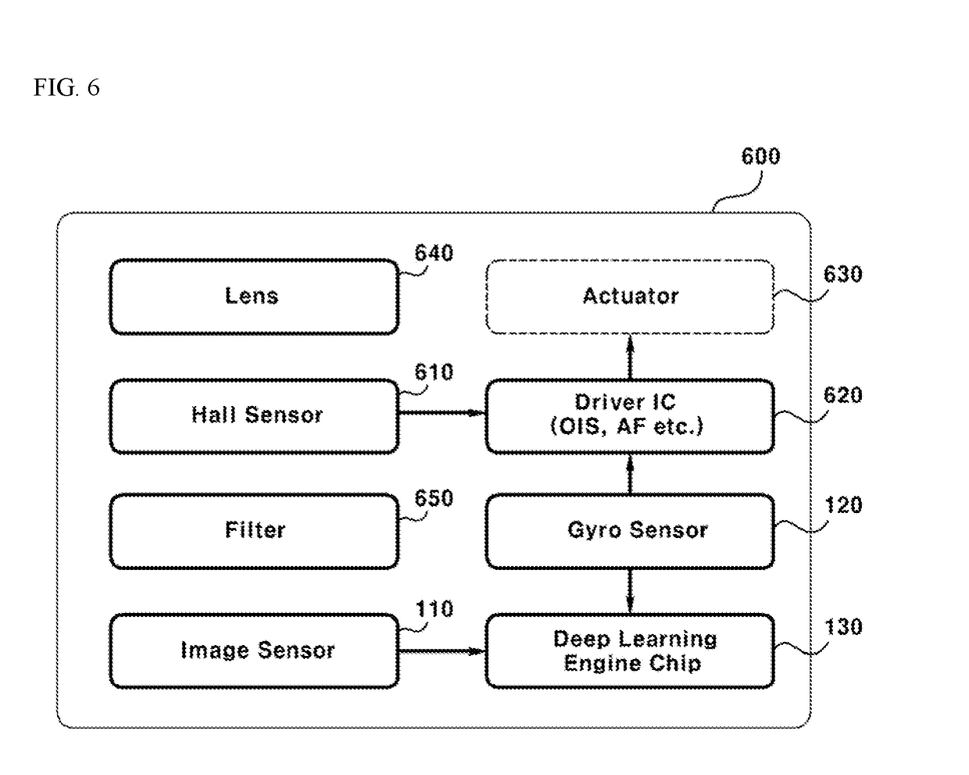
FIG. 6 is a block diagram of an image processing device according to another embodiment of the present invention.

By operating the actuator of the camera module using the position data being received by the processor 132 from a Hall sensor, when optically movement-compensated data is received as first Bayer data, the camera module 600 may have a shape as shown in FIG. 6. The camera module 600 may comprise a Hall sensor 610, a driver IC 620, an actuator 630, a lens 640, a filter 650, and the like.

The Hall sensor 610 detects the position of the lens 640 to sense the movement of the lens 640, and transmits the sensed data to a driver IC 620. In addition, the gyro sensor 120 detects a camera movement, generates gyro data, and transmits the generated gyro data to the driver IC 620. Here, the driver IC may perform optical image stabilization (OIS)

or auto focusing (AF). The driver IC controls the actuator 630 to move the current lens 640 sensed by a Hall sensor 610 according to the movement according to the gyro data sensed by the gyro sensor 120. Specifically, the driver IC 620 enables the lens 640 to capture the subject as the camera movement is compensated by operating an actuator 630 that operates to adjust the position of the lens 640. Through this OIS operation, the camera movement is compensated so that the processor 132 performs deep learning by using the gyro data received from the gyro sensor 120 to compensate the camera movement for the first Bayer data being received through the image sensor 110 and generates second Bayer data in which blur is removed.

The processor 132 may be formed of a chip including a deep learning network performing deep learning, and may perform other functions as well as a function of compensating for camera movement. For example, as in FIG. 7, second Bayer data having a resolution different from that of the first Bayer data may be generated without receiving the gyro data from the gyro sensor 120 by receiving the first Bayer data 137 from the image sensor 110. Or, by receiving the first IR data 710 from the ToF sensor 700, second IR data having a resolution different from that of the first IR data may also be generated. The output data 720 being outputted from the deep learning network 133 may be changed into such as second Bayer data, second IR data, or other data according to input data and deep learning parameters.

Figure 7:
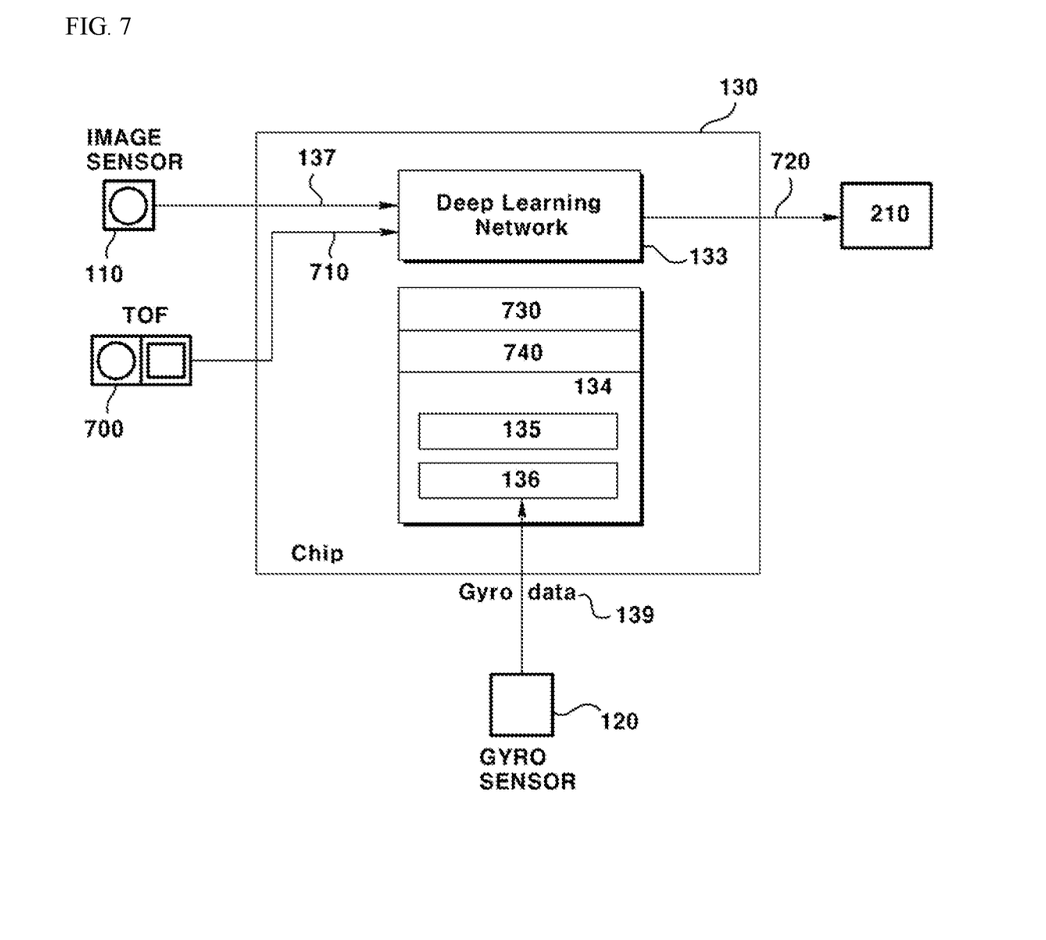
FIG. 7 is a diagram for describing a process in which an image processing device receives and processes Bayer data, gyro data, or IR data according to another embodiment of the present invention.

The ToF sensor 700 is one among the devices capable of obtaining depth information. According to the ToF method, the ToF sensor 700 calculates the distance to the object by measuring the time of flight, that is, the time when light is emitted and reflected. The ToF sensor 700 and the image sensor 110 may be disposed inside of one device, for example, one optical device, or implemented as separate devices to photograph the same area. The ToF sensor 700 generates an output light signal and then irradiates an object.

The ToF sensor 700 may use at least one of a direct method and an indirect method. In the case of the indirect method, an output light signal may be generated and outputted in the form of a pulse wave or a continuous wave. The continuous wave may be in the form of a sinusoid wave or a square wave. By generating the output light signal in the form of a pulse wave or a continuous wave, the ToF sensor 700 may detect a phase difference between the output light signal and the input light signal inputted to the ToF sensor 700 after being reflected from the object.

The direct method is a method of inferring the distance by measuring the time the output light signal sent toward the object returns to the receiver, and the indirect method is a method of indirectly measuring the distance using the phase difference when the sine wave sent toward the object returns to the receiver. It takes advantage of the difference between the peaks (maximum) or valleys (minimum) of two waveforms having the same frequency. The indirect method requires light with a large pulse width to increase the measuring distance, and there are characteristics in which as the measurement distance increases, the precision decreases, and conversely, as the precision increases, the measurement distance decreases. The direct method is more advantageous for long distance measurement than the indirect method.

The ToF sensor 700 generates an electrical signal from an input light signal. The phase difference between the output light and the input light is calculated using the generated electrical signal, and the distance between the object and the ToF sensor 700 is calculated using the phase difference. Specifically, the phase difference between the output light and the input light may be calculated using the information of the charge amount of the electrical signal. Four electrical signals may be generated for each frequency of the output light signal. Accordingly, the ToF sensor 700 may calculate the phase difference $t_d$ between the output light signal and the input light signal using Equation 1 below.

$$t_d = \arctan\left(\frac{Q_3 - Q_4}{Q_1 - Q_2}\right) \quad \text{[Equation 1]}$$

Here, $Q_1$ to $Q_4$ are the charge amounts of each of the four electrical signals. $Q_1$ is the electric charge amount of the electric signal corresponding to the reference signal of the same phase as the output light signal. $Q_2$ is the electric charge amount of the electrical signal corresponding to the reference signal 180 degrees slower in phase than the output optical signal. $Q_3$ is the electric charge amount of the electrical signal corresponding to the reference signal 90 degrees slower in phase than the output optical signal. $Q_4$ is the electric charge amount of the electrical signal corresponding to the reference signal 270 degrees slower in phase than the output light signal. Then, the distance between the object and the ToF sensor 700 may be calculated using the phase difference between the output light signal and the input light signal.

At this time, the distance d between the object and the ToF sensor 120 may be calculated using Equation 2 below.

$$d = \frac{c}{2f} \frac{t_d}{2\pi} \quad \text{[Equation 2]}$$

Here, c is the speed of light and f is the frequency of the output light.

The ToF sensor 700 generates an IR data using an output light and an input light. At this time, the ToF sensor 700 may generate raw data that is IR data for four phases. Here, the four phases may be 0°, 90°, 180°, and 270°, and the IR data for each phase may be data composed of digitized pixel values for each phase. IR data may be interchangeably used with phase data (image), phase IR data (image), and the like.

As described above, in performing various functions using a deep learning network, in order to perform each function, a separate processor may be implemented as a separate chip of an independent type, as shown in FIG. 7, when storing the deep learning parameters for each function and performing the corresponding function, a corresponding function may be performed by reading out the corresponding deep learning parameter. That is, each function can be performed by switching only the weight values learned for each function while using the same chip. When performing camera movement compensation, the camera movement compensation may be performed in the deep learning network 133 using first Bayer parameter 134 as the first deep learning parameter. The first Bayer data 134 may be comprised of a variable parameter 136 that varies according to the gyro data, and fixed parameters independent of gyro data 135, and the variable parameter 136 may be set according to the gyro data 139 being received. In addition, super resolution (SR) may be performed in the deep learning network 133 using second Bayer parameter 740 when performing super resolution that increases the resolution of Bayer data.

Super resolution is a process of generating a high resolution image based on a low resolution image, and functions as a digital zoom that generates a high resolution image from the low resolution image through image processing rather than a physical optical zoom. Super resolution may be used to improve the quality of a compressed or down-sampled image, or may be used to enhance the quality of an image having a resolution according to device limitations. In addition, it may be used to increase the resolution of an image in various fields.

In addition, when increasing the resolution of IR data, the resolution of IR data may be increased in the deep learning network 133 using the IR data parameter 730. When implemented using one deep learning network 133, each function may be sequentially performed. The quality of RGB images generated only with Bayer data in a low-light environment may be improved by using IR data with increased resolution. That is, in order to improve the image quality deterioration that may occur when generating an RGB image only with Bayer data, an RGB image with improved image quality can be generated through operation with IR.

A second RGB image may be generated by using the result value calculated by calculating the reflection component and IR image of the first RGB image generated using Bayer data generated in a low-light environment, and the like, and the hue component and chroma component of the first RGB image, To this end, the first RGB image is converted to the first HSV image through color channel conversion, and then, the brightness component (V) among the hue component (H), chroma component (S), and lightness component (V) of the first HSV image is separated into a reflection component and an illumination component, thereby extracting the reflection component. Here, the reflection component may include a high frequency component, the illumination component may include a low frequency component, and hereinafter, although it is explained as an example that in order to extract the reflection component, the brightness component (V) is separated into a low frequency component and a high frequency component, and then the high frequency component is separated therefrom, but is not limited thereto. A reflection component, for example, a high frequency component, may include gradient information or edge information of an image, and an illumination component, for example, a low frequency component, may include brightness information of the image.

To this end, the low frequency component (L) may be obtained by performing low pass filtering on the brightness component (V) of the first HSV image. If low pass filtering is performed on the brightness component (V) of the first HSV image, it may be blurred and thus gradient information or edge information may be lost. A high frequency component (R) of the brightness component of the first HSV image is obtained through an operation of removing the low frequency component (L). To this end, the brightness component (V) and the low frequency component (L) of the first HSV image may be calculated. For example, an operation of subtracting the low frequency component (L) from the brightness component (V) of the first HSV image may be performed.

The processor 132 may generate an IR image from the IR data with increased resolution. Here, the ToF IR image may be an amplitude image or an intensity image generated from IR data for four phases of 0°, 90°, 180° and 270°. At this time, before performing the operation with the first RGB image, the IR image may be compensated so that the operation with the RGB data is possible through interpolation and brightness compensation.

Figure 10:
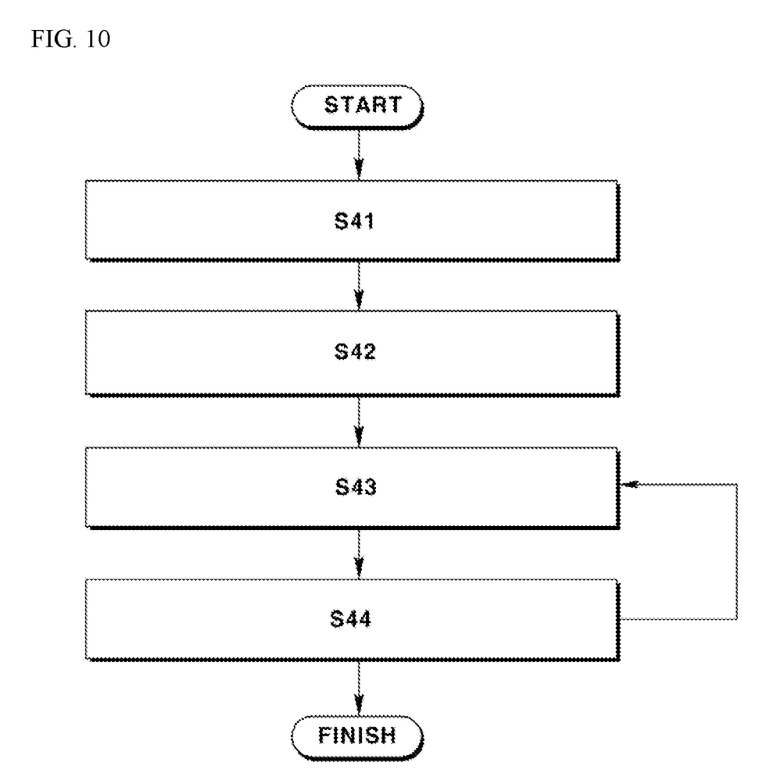
FIG. 10 is a flowchart of an image processing method according to an embodiment of the present invention.

While obtaining the illumination component for the brightness component of the first HSV image, the reflection component for the brightness component of the first HSV image, for example, the high frequency component and the ToF IR image, is used to obtain the second HSV Obtain the brightness component (V') of the image. Specifically, as shown in FIG. 10, a reflection component of the brightness component of the first HSV image, for example, a high frequency component and a ToF IR image may be matched. Here, a calculation for obtaining an image with improved brightness by merging the illumination component and the reflection component modeled using the ToF IR image may be used, and this may be a calculation opposite to the calculation used to remove the low frequency component L from the brightness component of the first HSV image. For example, an operation in which a reflection component, for example, a high frequency component, and a ToF IR image are added to the brightness component of the first HSV image may be performed. In this way, after removing the illumination component for the brightness component of the first HSV image, for example, the low frequency component, and when calculates the reflection component for the brightness component of the first HSV image, for example, the high frequency component and the ToF IR image, the brightness of RGB images photographed in a low luminance environment can be improved.

After that, a second RGB image is generated through color channel conversion using the brightness component (V'), and the hue component (H) and chroma component (S) obtained through the color channel conversion. In the HSV image, the hue component (H) and the chroma component (S) may have color information, and the brightness component may have brightness information. When only the reflection component of the brightness component is used as calculated with the ToF IR image (V') and the hue component (H) and chroma component (S) are used as previously obtained, only the brightness in a low luminance environment is improved without color distortion. The input image may consist of a product of a reflection component and an illumination component; the reflection component may consist of a high frequency component; the illumination component may consist of a low frequency component; and the brightness of the image may be affected by the illumination component. However, when the illumination component, that is, the low frequency component, is removed from the RGB image photographed in a low luminance environment, the brightness value of the RGB image may become excessively high. In order to compensate for this, by matching the ToF IR image with the brightness component of the RGB image from which the illumination component, that is, the low frequency component, has been removed, as a result, an RGB image with improved image quality can be obtained in a low luminance environment.

Through this, a high resolution RGB image, a high resolution IR image, and a high resolution depth image can be generated. In addition, since the IR image has a very lower resolution (1 Mp or less) than the RGB image, the processor that processes the IR data at a high resolution is suitable to be implemented in the form of a chip. In order to make a miniaturized chip, it is important to minimize the data memory required for algorithm logic and computation, and this is because the resolution of the camera device is directly related to the memory and the amount of computation.

The processor 132 may be implemented in the form of an independent chip. Or, it may be formed in one component or functional block unit of another chip. The processor 132 may be formed on an image sensor module, a camera module, or an AP module. The OIS function for compensating for camera movement may be formed inside the image sensor module, and the processor 132 may be formed inside the image sensor module as described above. At this time, the image sensor may be included in the internal ROIC. Or, the processor 132 may be formed in the camera module separately from the image sensor 110. At this time, it may be formed by being integrated with the driver IC. A description of the case in which the camera module is formed will be described later in detail with reference to FIGS. 8 to 9.

The processor 132 may be formed on the AP module. Here, the application processor (AP) is a mobile memory chip and means a core semiconductor in charge of various application operations and graphic processing in the mobile terminal device. The AP can be implemented in the form of a system on chip (SoC) that includes both the functions of a computer's central processor (CPU) and the functions of a chipset that controls the connection of other devices such as memory, hard disk, and graphic card. The processor 132 may be formed in the form of a separate chip on the AP module or in the form of an IP block. At this time, the processor 132 may be formed separately from the ISP.

Figure 8:
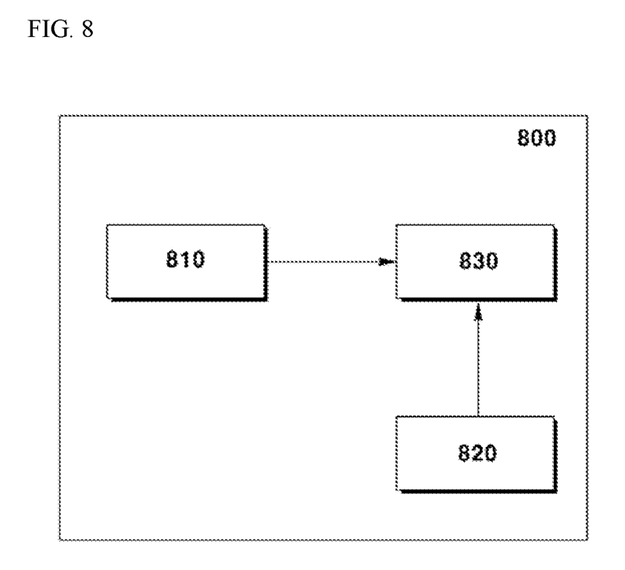
FIG. 8 is a block diagram of a camera module according to an embodiment of the present invention.

FIG. 8 is a block diagram of a camera module 800 according to an embodiment of the present invention. The processor generating second Bayer data from first Bayer data may be formed in the configuration of the first processor 830 of the camera module 800 as shown in FIG. 8.

Figure 9:
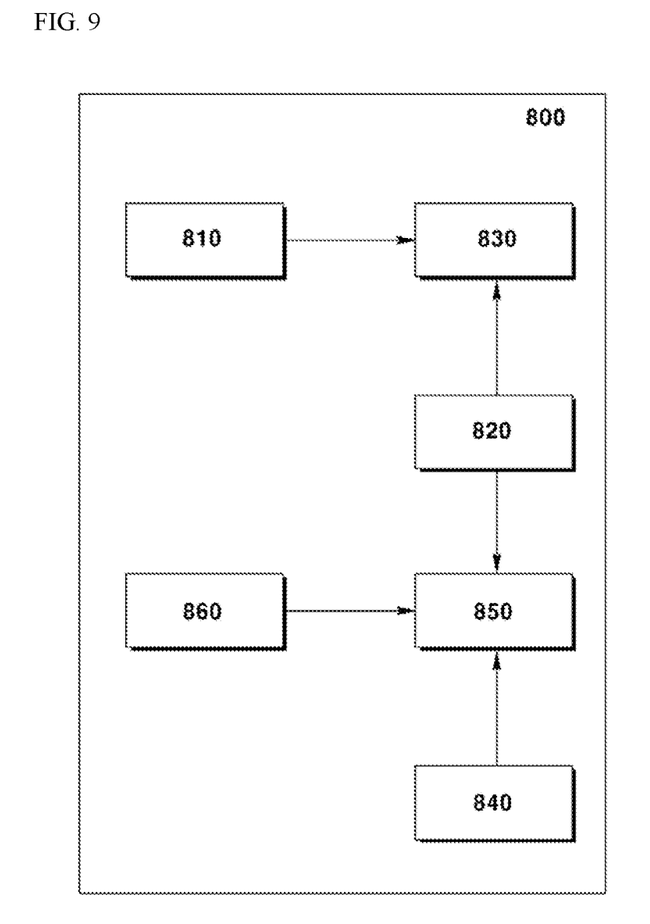
FIG. 9 is a block diagram of a camera module according to another embodiment of the present invention.

The camera module 800 according to an embodiment of the present invention may comprise an image sensor 810, a gyro sensor 820, and a first processor 830 as shown in FIG. 8, and as shown in FIG. 9, it may include a Hall sensor 840, a second processor 850, and an actuator 860. Since the detailed description of the first processor 830 of the camera module 800 of FIGS. 8 and 9 corresponds to a detailed description of the processor 132 of the image processing device 130 of FIGS. 1 to 7, hereinafter, overlapping descriptions will be omitted.

The image sensor 810 generates first Bayer data, and the gyro sensor 820 detects movement and generates gyro data. The first processor 830 generates second Bayer data obtained by compensating for camera movement from the first Bayer data by using the gyro data received.

The first processor 830 may generate the second Bayer data from the first Bayer data by performing deep learning, and may perform deep learning by using the first deep learning parameter derived through training on Bayer data processing. Here, the training for the Bayer data processing may perform the training by: Receiving continuous Bayer data and gyro data in a moving environment; obtaining an average image of adjacent frames of a first frame data that is one among the continuous Bayer data; generating input data based on the frame data following the first frame data by performing degradation on the average image obtained; using the generated input data and gyro data as deep learning training input data; and using the first frame data as deep learning training comparison data.

The first processor 830 may remove blur included in the first Bayer data. Through this, it is possible to compensate for camera movement and remove the blur at the same time.

The Hall sensor 840 may generate position data by detecting the movement of the camera module.

The second processor 850 operates the actuator 860 using the position data received from the Hall sensor 840, and the actuator 860 may operate under the control of the second processor 850. The second processor 850 may perform the OIS function by operating the actuator 860 as described above.

An image processing method according to an embodiment of the present invention is performed by the steps described below. A detailed description of each step of the image processing method corresponds to the detailed description of the image processing device 130 of FIGS. 1 to 7 to the camera module 800 of FIGS. 8 to 9, overlapping descriptions will be omitted.

An image processing method according to an embodiment of the present invention relates to a method for processing an image in an image processing device including one or more processors.

In step S11, first Bayer data is received from the image sensor, and gyro data is received from the gyro sensor; and in step S12, the second Bayer data is generated by compensating for camera movement from the first Bayer data using the gyro data received. In generating second Bayer data, as in step S21, deep learning may be performed to generate the second Bayer data from the first Bayer data.

In addition, in generating the second Bayer data, in step S31, the second Bayer data may be generated by removing a blur included in the first Bayer data.

In addition, in generating the second Bayer data by performing deep learning, deep learning may be performed using deep learning parameters derived through training on Bayer data processing.

The deep learning parameter may include a variable parameter variable according to the gyro data and a fixed parameter independent of the gyro data, and the variable parameter may be set according to the gyro data.

Training for the Bayer data processing may be performed through steps S41 to S44 as shown in FIG. 10. In step S41, continuous Bayer data and gyro data are received in an environment with movement; in step S42, an average image of adjacent frames of the first frame data, which is one of the continuous Bayer data, is obtained, and degradation is performed on the obtained average image based on frame data following the first frame data to generate input data; in step S43, generates output data using the generated input data and gyro data as deep learning training input data; in step S44, the output data and the first frame data are compared and analyzed, and the deep learning parameters are adjusted using the comparative analysis result; and steps S43 and S44 may be repeatedly performed until the comparative analysis result satisfies a predetermined criterion.

In addition, the first Bayer data may be the data in which movement is compensated optically by operating the actuator of the camera module using the position data received from a Hall sensor.

Meanwhile, the embodiments of the present invention can be implemented as computer-readable codes on a computer-readable recording medium. The computer-readable recording medium includes all types of recording devices in which data readable by a computer system is stored.

As examples of computer-readable recording media there are ROM, RAM, CD-ROM, magnetic tape, floppy disk, and optical data storage devices, and in addition, they are distributed across networked computer systems in a distributed manner in which computer-readable code can be stored and executed. And functional programs, codes, and code segments for implementing the present invention can be easily inferred by programmers in the technical field to which the present invention belongs.

As described above, in the present invention, specific matters such as specific components, and the like; and limited embodiments and drawings have been described, but these are only provided to help a more general understanding of the present invention, and the present invention is not limited to the above embodiments, and various modifications and variations are possible from these descriptions by those of ordinary skill in the art to which the present invention belongs.

Therefore, the spirit of the present invention should not be limited to the described embodiments, and not only the claims to be described later, but also all those with equivalent or equivalent modifications to the claims will be said to belong to the scope of the spirit of the present invention.

The invention claimed is:

1. An image processing device comprising:
a processor configured to receive a first Bayer data from an image sensor, receive a gyro data from a gyro sensor, and generate a second Bayer data obtained by compensating for camera movement from the first Bayer data using the gyro data received,
wherein the processor comprises a deep learning network which generates the second Bayer data from the first Bayer data,
wherein the processor generates the second Bayer data using a first deep learning parameter derived through training on Bayer data processing, and
wherein the first deep learning parameter comprises:
a variable parameter that varies according to the gyro data; and
a fixed parameter independent of the gyro data.

2. The image processing device according to claim 1, wherein the processor performs deep learning to generate the second Bayer data from the first Bayer data.

3. The image processing device according to claim 1, wherein the processor removes blur comprised in the first Bayer data.

4. The image processing device according to claim 1, wherein the training for Bayer data processing performs the training by:
receiving continuous Bayer data and gyro data in a moving environment;
obtaining an average image of adjacent frames of a first frame data that is one of the continuous Bayer data;
generating input data by performing degradation on the obtained average image based on frame data following the first frame data;
using the generated input data and gyro data as deep learning training input data; and
using the first frame data as deep learning training comparison data.

5. The image processing device according to claim 1, wherein the first Bayer data is data whose movement is optically compensated by operating an actuator of the camera module using position data being received from a Hall sensor.

6. The image processing device according to claim 1, wherein the processor is formed on an image sensor module.

7. The image processing device according to claim 1, wherein the processor is formed on a camera module or an application processor module.

8. A camera module comprising:
an image sensor configured to generate a first Bayer data;
a gyro sensor configured to detect movement and generate a gyro data; and
a first processor configured to generate a second Bayer data obtained by compensating for camera movement from the first Bayer data by using the gyro data received;
wherein the processor comprises a deep learning network which generates the second Bayer data from the first Bayer data,
wherein the processor generates the second Bayer data using a first deep learning parameter derived through training on Bayer data processing, and
wherein the first deep learning parameter comprises:
a variable parameter that varies according to the gyro data; and
a fixed parameter independent of the gyro data.

9. The camera module according to claim 8, comprising:
a Hall sensor configured to generate a position data by detecting the movement of the camera module;
a second processor configured to operate an actuator using the position data received from the Hall sensor; and
an actuator operating under control of the second processor.

10. The camera module according to claim 8, wherein the first processor removes blur comprised in the first Bayer data.

11. The camera module according to claim 9, wherein the training for Bayer data processing performs the training by:
receiving continuous Bayer data and gyro data in a moving environment;
obtaining an average image of adjacent frames of a first frame data that is one of the continuous Bayer data;
generating input data by performing degradation on the obtained average image based on frame data following the first frame data;
using the generated input data and gyro data as deep learning training input data; and
using the first frame data as deep learning training comparison data.

12. The camera module according to claim 9, wherein the first Bayer data is data whose movement is optically compensated by operating an actuator of the camera module using position data being received from the Hall sensor.

13. The camera module according to claim 8, comprising:
a time of flight (ToF) sensor configured to generate a first infrared (IR) data,
wherein the first processor generates a second IR data from the first IR data having different resolution from the first IR data.

14. The camera module according to claim 13, wherein the first processor generates the second Bayer data from the first Bayer data by using the second IR data.

* * * * *